United States Patent [19]
Elrod, Jr.

[11] Patent Number: 5,504,409
[45] Date of Patent: Apr. 2, 1996

[54] DIRECT DRIVE SERVOVALVE HAVING TWO LANDED SPOOL POWER STAGE

[75] Inventor: Alvon C. Elrod, Jr., Ventura, Calif.

[73] Assignee: HR Textron Inc., Valencia, Calif.

[21] Appl. No.: 187,941

[22] Filed: Jan. 27, 1994

[51] Int. Cl.⁶ .................................... G05B 17/00
[52] U.S. Cl. .................. 318/689; 318/687; 251/129.03
[58] Field of Search ...................... 91/51, 446; 251/14, 251/129.03; 137/117, 625.64; 318/560, 689, 671, 687, 432

[56] References Cited

U.S. PATENT DOCUMENTS

| | | |
|---|---|---|
| 2,697,016 | 12/1954 | Spurgeon . |
| 2,769,943 | 11/1956 | Matthews . |
| 4,197,474 | 4/1980 | Honigsbaum . |
| 4,227,440 | 10/1980 | Leonard ........................ 91/51 |
| 4,339,737 | 7/1982 | Meyers et al. . |
| 4,452,423 | 6/1984 | Beblavi et al. . |
| 4,702,123 | 10/1987 | Hirao et al. . |
| 4,793,377 | 12/1988 | Haynes et al. . |
| 4,889,161 | 12/1989 | Janecke ................................. 91/446 X |
| 5,150,876 | 9/1992 | Pickard ...................... 251/14 |

FOREIGN PATENT DOCUMENTS

| | | |
|---|---|---|
| 601808 | 7/1960 | Canada . |
| 1521668 | 6/1977 | United Kingdom . |

*Primary Examiner*—David S. Martin
*Attorney, Agent, or Firm*—Robbins, Berliner & Carson

[57] ABSTRACT

A direct drive servovalve which includes a limited angle force motor having an eccentric engaging a two landed spool for converting rotary motion of the motor rotor into linear motion of the spool so as to control the flow of fluid from a source under pressure thereof of to a load. The two landed spool is in direct contact with a wall of the bore defined within the valve housing as opposed to utilization of a sleeve interposed between the wall of the bore and the spool valve. A pressure equalizing passageway is connected between the pressure passageways for the purpose of substantially reducing pressure drop when the spool valve translates to allow flow of fluid through the valve.

8 Claims, 2 Drawing Sheets

FIG. 3
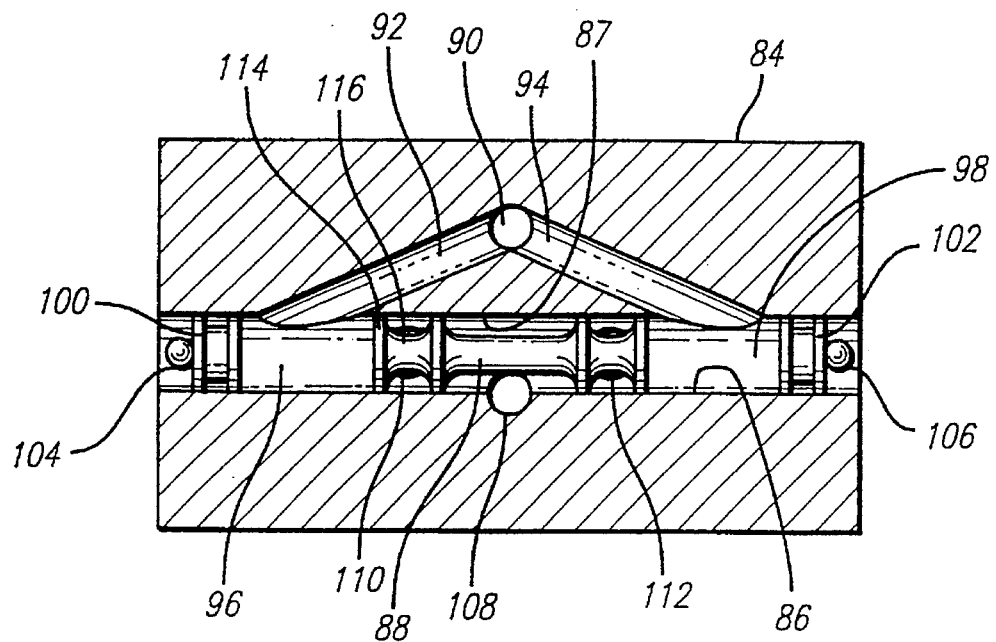
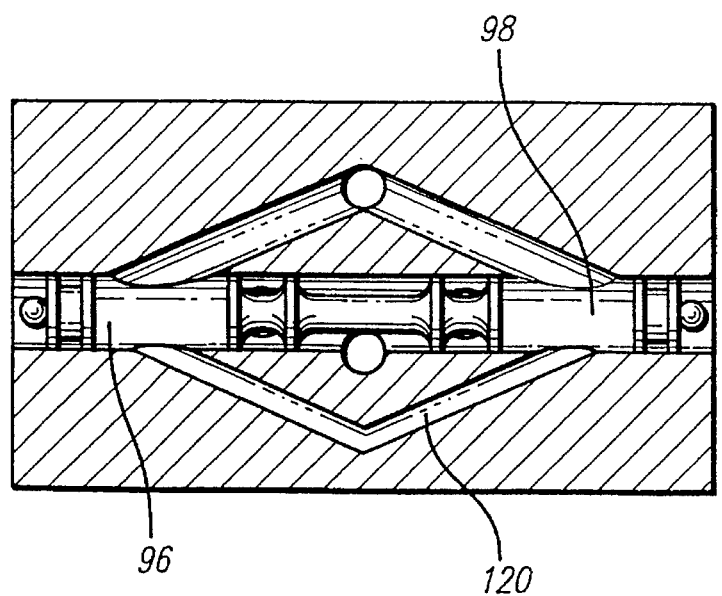
FIG. 4

DIRECT DRIVE SERVOVALVE HAVING TWO LANDED SPOOL POWER STAGE

FIELD OF THE INVENTION

This invention relates to direct drive servovalves and more particularly to a direct drive servovalve in which rotational motion of a motor rotor is converted into linear motion of a spool valve wherein the spool valve utilizes a two landed spool in direct contact with a wall of a bore defined within the valve housing.

BACKGROUND OF THE INVENTION

Torque motor driven spool valves are well known in the art including those which operate through the utilization of a rotary torque motor having a drive member extending eccentrically from the rotor thereof into contact with the spool valve. The drive member directly reciprocates the spool within a bore provided in the valve housing to thereby control the flow of fluid from a source thereof to the load in response to electrical signals applied to the drive motor. Typical of such direct drive servovalves are those shown in U.S. Pat. Nos. 4,793,377; 4,197,474; 2,769,943; 2,697,106; 4,452,423; 4,339,737; 4,702,123, Canadian Patent 601808 issued July 1960 and United Kingdom Patent 1521668 issued Aug. 16, 1978.

As is readily noted from the typical prior art, direct drive servovalves incorporate a housing within which there is disposed a sleeve within which in turn is disposed a spool which moves reciprocally. The sleeve is typically manufactured of hardened steel and the spool of aluminum. Titanium or steel is typically used for the housing. Large annuli are formed in the sleeve to maximize the flow capacity for a given spool diameter and to provide for symmetric sleeve porting to pressure balance the spool radially. The associated intricate sleeve machining, critical sizing of the sleeve and fitting it to the housing and the assembly process required to substantially eliminate leakage between the sleeve and the housing add substantially to the manufacturing cost of such valves.

SUMMARY OF THE INVENTION

In accordance with the present invention there is provided a direct drive servovalve which includes a two landed spool reciprocally mounted within a bore having a wall and being defined by a valve housing. A motor means includes an eccentrically disposed drive member which engages the two landed spool to move it within the bore to provide control over the flow of fluid through the valve. The spool is mounted in direct contact with the wall of the bore and without a sleeve.

In accordance with a more specific aspect of the present invention, the application of fluid under pressure from the source thereof to the bore within which the valve is disposed is accomplished by providing direct passageways through the valve housing to the bore in which the spool is disposed.

In accordance with a further aspect of the present invention, pressure balancing of the two landed spool is accomplished by providing an additional passageway interconnecting the end chambers within the bore to thereby substantially reduce any differential pressures which may exist therebetween.

BRIEF DESCRIPTION OF THE DRAWINGS

FIG. 3 is a cross sectional schematic diagram illustrating the manner of interconnecting supply pressure to the two landed spool; and FIG. 4 is a schematic diagram illustrating pressure balancing of the two landed spool.

DETAILED DESCRIPTION

Servovalves for positioning an actuator and consequently a load connected thereto are well known in the prior art. Conventional electrohydraulic servovalves (EHSV) which utilize a pilot stage comprising a nozzle-flapper or jet pipe connected to the torque motor, have been traditionally used for some time. Such structures require the use of a three, four, or more, landed spool. The two outboard lands serve to separate the spool end chamber (first stage pilot) pressures from the adjacent second stage flow-control pressure cavities. For EHSVs the spool end chamber pressures are necessary for spool drive forces which are generated by the differential pressures from the pilot stage.

Direct drive servovalves have been developed which have operational capabilities which surpass conventional EHSVs in the areas of reliability, dynamic response, power efficiency and tolerance of external disturbances, such as, hydraulic pressure and temperature fluctuations, vibration, accelerations and contaminated fluid. However, the currently accepted direct drive servovalves of the type shown in the above described prior art patents are costly.

The purpose of the present invention is to eliminate the additional costs associated with the EHSVs and the currently accepted direct drive valves while at the same time taking advantage of the better operational characteristics of the rotary to linear direct drive valve design.

Figure 1:
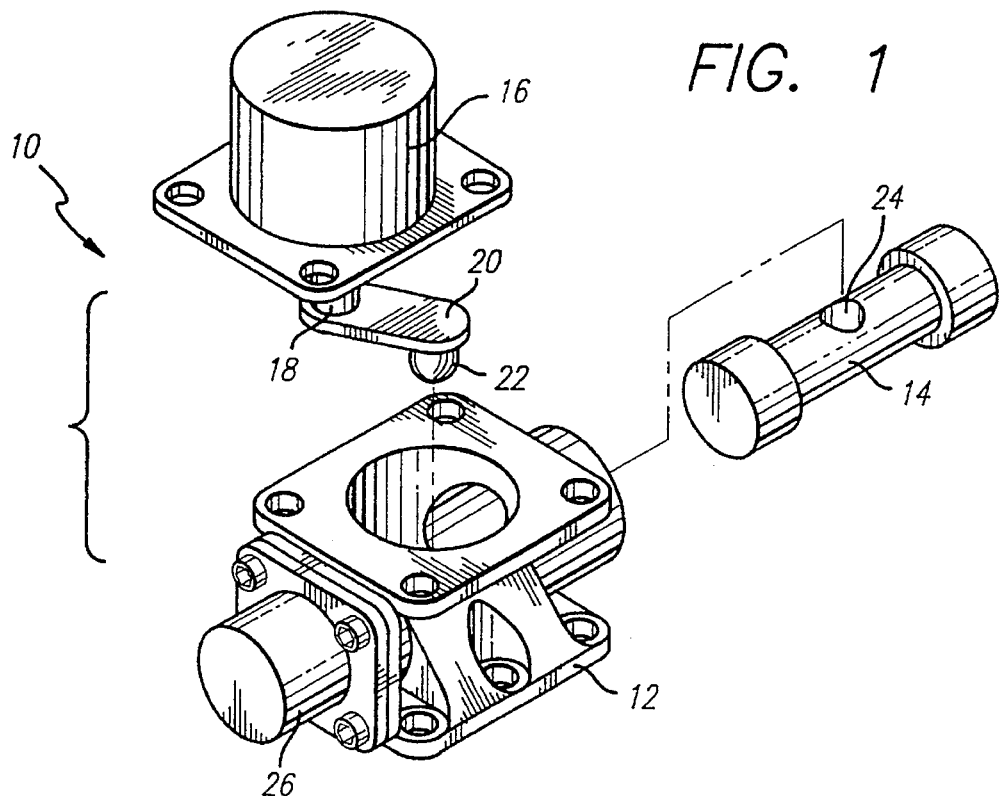
FIG. 1 is a schematic representation showing a limited angle direct drive servovalve utilizing a two landed spool in accordance with the principles of the present invention.

Referring now more particularly to FIG. 1 there is schematically illustrated in exploded format a direct drive valve 10 constructed in accordance with the principles of the present invention. As is therein shown, the direct drive valve 10 includes a valve housing 12 within which there is disposed a two landed spool 14. A limited angle torque motor 16 is positioned on the upper surface of the valve housing 12 and includes a rotor having a shaft 18 extending therefrom. Attached to the rotor shaft 18 is eccentric 20 having a drive ball 22 which engages an opening 24 existing in the two landed spool 14. Upon reciprocation of the shaft 18 the drive ball 22 oscillates about the center axis of the shaft 18. Because the drive ball 22 engages the opening 24 the two landed spool reciprocates within a bore provided in the valve housing 12. Such reciprocation controls the flow of fluid from a source under pressure (not shown) to an appropriate load. A position sensing device 26 such as a linear variable differential transformer (LVDT) is affixed to the housing 12 and engages the two landed spool 14 to provide an output electrical signal which is proportional to the position of the two landed spool 14. The output signals are used to close a servo loop between the valve and the control signals applied to the torque motor 16 to accomplish appropriate spool positioning to provide the desired output flow to the load as is well known in the prior art.

It should be understood that, although an LVDT 26 is shown to provide the positioning information with regard to the direct drive valve 10, other devices may also be utilized with the same effect and in fact better efficiency.

Figure 2:
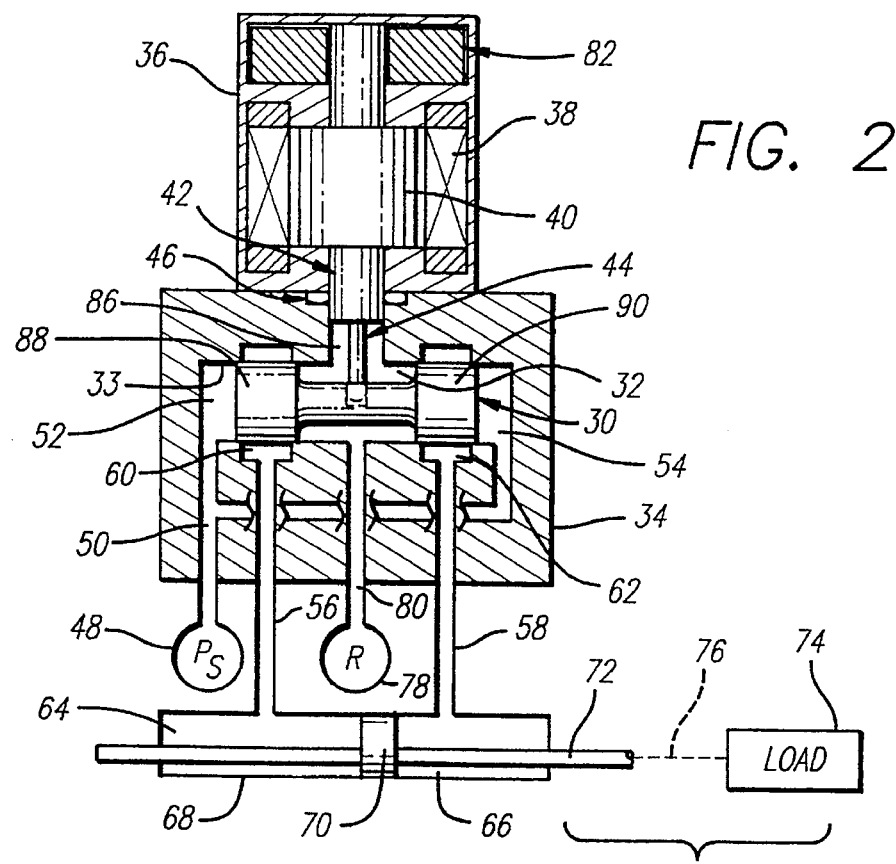
FIG. 2 is a simplified schematic diagram partly in cross section illustrative of a valve such as that shown in FIG. 1 interconnected to a load.

As is shown in FIG. 2, a valve such as that shown in FIG. 1 may be connected to an actuator which in turn positions a load in accordance with appropriate signals that are applied to the motor. As is shown in FIG. 2, a two landed spool 30 having end surfaces is disposed for reciprocation within a bore 32 provided within a housing 34 and having a wall 33. A torque motor 36 of the limited angle variety includes appropriate field windings 38 within which there is disposed a rotor 40 containing the usual permanent magnets mounted upon a rotor shaft 42 from which extends a driver means 44 which is eccentrically disposed upon and extends from the rotor shaft 42. The torque motor 36 is mounted upon the housing 34 and includes seals 46 which preclude the flow of fluid under pressure from the valve area into the motor area. Alternatively a frictionless fluid barrier (not shown) may be used which will allow portions of the drive motor to run "wet" but prevents the pressurized fluid from escaping to the surrounding environment.

A source of fluid under pressure 48 is connected to appropriate passageways 50 within the housing 34 so as to supply the fluid under pressure to the chambers 52 and 54 which exist at each end of the bore 32 and are bordered by the end surfaces of the two landed spool 30. Additional passageways 56 and 58 are connected to ports 60 and 62 respectively and in turn to opposite end chambers 64 and 66 of an actuator 68. The actuator 68 includes a piston 70 having a piston rod 72 connected thereto. The piston rod 72 in turn is connected to a load 74 as is indicated by the dashed line 76. System return 78 is connected through passageway 80 to the chamber 86 disposed between the lands 88 and 90 of the two landed spool 30. If desired one may reverse the connection of system pressure and return so that the source 48 is connected to passageway 80 while return is connected to passageway 50.

When electrical signals are applied to the field windings 38 of the motor, the rotor shaft 42 rotates thus causing the drive member 44 which is eccentrically disposed on the rotor shaft 42 to oscillate in turn translating this rotary motion to linear motion of the two landed spool 30. As the two landed spool 30 moves in either direction, fluid under pressure from the source 48 will be supplied through one or the other of the passageways 56 and 58 to one of the chambers 64 or 66 of the actuator 68 thereby causing the piston 70 to move and in turn move the load responsively thereto.

For example, if the drive member 44 is activated in such a way that the two landed spool 30 moves toward the right, as viewed in FIG. 2, land 88 uncovers the port 60 allowing fluid under pressure appearing in the chamber 52 to flow from the source through the port 60 and the passageway 56 to the chamber 64 of the actuator 68 thereby moving the piston toward the right as viewed in FIG. 2. At the same time, the port 62 is uncovered by the land 90 allowing the fluid appearing in the chamber 66 of the actuator 68 to flow through the port 62 and to system return 78. Obviously if the two landed spool 30 is moved toward the left as viewed in FIG. 2 the reverse operation occurs.

As an alternative to the LVDT 26 shown in FIG. 1 a position sensor means 82 may be incorporated as a part of the motor structure to provide an output signal proportional to the rotor position of the motor. The motor rotor position sensor means 82 may take the form of a potentiometer which is disposed within the motor housing 36 or alternatively may take the form of a Hall effect device which is disposed therein and senses the magnetic field of the permanent magnets affixed to the rotor or alternatively an additional permanent magnet which may be affixed to the rotor shaft 42.

By referring now more particularly to FIG. 3 there is illustrated one specific construction for the two landed spool and the manner in which fluid under pressure is applied to the opposite ends thereof. As is shown in FIG. 3, the housing 84 includes a bore 86 within which the two landed spool 88 is directly disposed. As is shown the spool 88 directly contacts the wall 87 of the bore 86. Fluid under pressure is applied through a passageway 90 and is provided to additional passageways 92 and 94 which intersect therewith. The passageways 92 and 94 are formed by any means known to the art such as bores drilled through the housing 84 (assuming the housing is constructed of metal) or, alternatively, bores formed by appropriate inserts within a plastic housing during its being molded. In any event, the passageways 92 and 94 intersect directly with the bore 86. An important feature of this invention is that the passageways are produced in a manner such that it does not leave a machined or molded access hole that would require plugging with an O-ringed plug, Lee Plug, or similar means, thus reducing the valve cost, this is shown in FIGS. 3 and 4, in which the access to the drilled passageways 92 and 94 is gained through the ends of the main bore 86, as opposed to the conventional manner of drilling a parallel passage and kidney cutting into the main bore 86.

An additional important feature of the present invention is that the bore 86 does not include any type of sleeve surrounding the two landed spool 88. Each of the bores 92 and 94 by intersecting with the bore 86 directly provide fluid to the chambers 96 and 98 which extend between and are bordered by the ends of the lands on the two landed spool 88 and plugs 100 and 102 which are held in place by pins 104 and 106 and are used to seal each end of the bore 86. The return opening in the housing 84 is shown at 108 with the flow ports 110 and 112 illustrated disposed beneath the lands of the two landed spool 88. It should be noted that the two landed spool 88 is constructed such that each of the lands has a reduced diameter center portion with the edges thereof controlling opening of the flow ports 110 and 112. Through the utilization of this reduced diameter portion or annuli the flow of fluid under pressure from the source thereof through the valve is enhanced. Such enhancement occurs through opening of the flow port 110 or 112 with the fluid then passing by the land edge as shown at 114 and entering the annuli as illustrated by the reduced diameter portion 116 and filling the same to then permit additional fluid flow more readily from the chamber 96 into the flow port 110.

This is particularly important where ports 110 and 112 intersection with the bore 86 comprises a significant portion of the circumference of the bore 86.

It has been discovered that in some applications, when utilizing the structure as illustrated in FIG. 3, the flow of the fluid from a chamber such as 96 into a flow port such as 110 when the land edge 114 opens the same a reduced pressure occurs in the chamber 96 as compared to that existing in the chamber 98. Such differential pressure applied to the ends of each of the lands on the two landed spool 88 can result in some undesirable instability or pressure unbalance. To overcome this problem, a structure such as that illustrated in FIG. 4, to which reference is hereby made, may be utilized.

As is shown in FIG. 4, the structure is identical to that shown in FIG. 3 with the one exception that an additional passageway 120 has been provided which connects the chambers 96 and 98 together. This secondary passageway 120 is separate from the primary flow passageways 92 and 94 and thus is less affected by pressure drops caused by flow; therefore it provides a means for unbalanced pressures in end chambers 96 and 98 to approach equal pressure. As a result, any instability which might occur as a result of pressure drops upon reciprocation of the two landed spool 88 is overcome.

There has thus been disclosed a very simple inexpensive to construct two landed spool, limited angle, rotary to linear direct drive servovalve.

What is claimed is:

1. A rotary to linear direct drive servovalve comprising:
   a housing defining a bore having a wall;
   a two landed spool reciprocally disposed in said bore in direct contact with said wall, each land of said two landed spool having a reduced diameter section disposed between metering edges thereof; and
   motor means mounted upon said housing and including an eccentrically disposed rotary drive member engaging said spool for linearly moving the same in response to electrical signals applied to said motor means.

2. A direct drive servovalve as defined in claim 1 wherein said reduced diameter section defines a section of an annulus.

3. A direct drive servovalve as defined in claim 1 wherein said bore defines first and second chambers disposed at first and second ends of said bore with a border of each said chamber being an outer end surface of said two landed spool and which further includes passageway means defined by said housing in direct communication with each of said chambers for providing fluid under pressure to said chambers.

4. A direct drive servovalve as defined in claim 3 wherein each of said chambers is further bordered by plug means disposed at opposite ends of said bore.

5. A direct drive servovalve as defined in claim 3 which further includes second passageway means interconnecting said first and second chambers for equalizing the pressure therein.

6. A rotary to linear direct drive servovalve comprising:
   a housing defining a bore having a wall and first and second ends;
   means for closing said first and second ends of said bore;
   a two landed spool having first and second end surfaces reciprocally disposed in said bore in direct contact with said wall;
   said bore defining first and second chambers between said first and second spool end surfaces and said means for closing said first and second ends of said bore respectively;
   passageway means defined by said housing in direct communication with each of said first and second chambers for providing fluid under pressure to said chambers; and
   motor means mounted upon said housing and including an eccentrically disposed drive member engaging said spool for moving the same in response to electrical signals applied to said motor means.

7. A direct drive servovalve as defined in claim 6 wherein said means for closing includes plug means disposed at opposite ends of said bore.

8. A direct drive servovalve as defined in claim 7 which further includes second passageway means interconnecting said first and second chambers for equalizing the pressure therein.

* * * * *